United States Patent
Song et al.

(10) Patent No.: US 8,698,348 B2
(45) Date of Patent: Apr. 15, 2014

(54) SYSTEM AND METHOD FOR MANAGING A POWER SOURCE IN A VEHICLE

(75) Inventors: Jing Song, Novi, MI (US); Richard Dyche Anderson, Plymouth, MI (US); Douglas A. Oliver, Redford, MI (US); Scott James Thompson, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 12/987,207

(22) Filed: Jan. 10, 2011

(65) Prior Publication Data

US 2012/0175946 A1     Jul. 12, 2012

(51) Int. Cl.
*B60L 1/00* (2006.01)
*B60L 3/00* (2006.01)
*H02G 3/00* (2006.01)

(52) U.S. Cl.
USPC .......................... 307/9.1; 307/10.1; 320/134

(58) Field of Classification Search
USPC ........................................................ 307/9.1
See application file for complete search history.

(56) References Cited

U.S. PATENT DOCUMENTS

| | | | |
|---|---|---|---|
| 5,842,534 A | 12/1998 | Frank | |
| 6,011,380 A | 1/2000 | Paryani et al. | |
| 6,054,844 A | 4/2000 | Frank | |
| 6,116,363 A | 9/2000 | Frank | |
| 6,314,346 B1 | 11/2001 | Kitajima et al. | |
| 6,441,619 B1 | 8/2002 | Araki et al. | |
| 6,646,419 B1 | 11/2003 | Ying | |
| 6,816,759 B2 | 11/2004 | Kimura | |
| 6,856,866 B2 | 2/2005 | Nakao | |
| 7,447,601 B2 | 11/2008 | Lhermite et al. | |
| 7,472,769 B2 | 1/2009 | Yamanaka et al. | |
| 7,570,021 B2 | 8/2009 | Togashi et al. | |
| 7,730,333 B2 | 6/2010 | Berkes et al. | |
| 7,802,120 B2 | 9/2010 | Conroy et al. | |
| 7,941,675 B2 | 5/2011 | Burr et al. | |
| 7,982,435 B2 | 7/2011 | Masuda | |

(Continued)

FOREIGN PATENT DOCUMENTS

| | | |
|---|---|---|
| EP | 1754977 A2 | 2/2007 |
| EP | 1911650 A1 | 4/2008 |

(Continued)

OTHER PUBLICATIONS

Kandler Smith and Chao-Yang Wang, Pulse Discharge Power Availability of a Lithium-Ion Hybrid Vehicle Battery Pack, SAE International, www.sae.org, Document No. 2005-01-3464, Sep. 2005, 1 pg.

(Continued)

*Primary Examiner* — Rexford Barnie
*Assistant Examiner* — Toan Vu
(74) *Attorney, Agent, or Firm* — David B. Kelley; Brooks Kushman, P.C.

(57) ABSTRACT

A system and method for managing a power source in a vehicle that has an engine and an electric machine operable to provide torque to start the engine, includes the step of setting a first discharge power limit for the power source that is at least partly based on the power capability of the power source. A second discharge power limit for the power source is also set. The second discharge power limit is higher than the first discharge power limit, and it is a function of at least the power capability of the power source and the first discharge power limit.

20 Claims, 2 Drawing Sheets

(56) References Cited

U.S. PATENT DOCUMENTS

| | | |
|---|---|---|
| 8,103,485 B2 | 1/2012 | Plett |
| 8,224,514 B2 | 7/2012 | Center et al. |
| 2003/0052650 A1 | 3/2003 | Gunji |
| 2005/0040789 A1 | 2/2005 | Salasoo et al. |
| 2006/0021809 A1 | 2/2006 | Xu et al. |
| 2006/0100057 A1 | 5/2006 | Severinsky et al. |
| 2006/0100833 A1 | 5/2006 | Plett |
| 2006/0139004 A1 | 6/2006 | Uesugi et al. |
| 2007/0102207 A1 | 5/2007 | Yamanaka et al. |
| 2007/0233334 A1 | 10/2007 | Kozarekar |
| 2007/0272456 A1 | 11/2007 | Shiiba |
| 2009/0058366 A1 | 3/2009 | Masuda |
| 2009/0118079 A1 | 5/2009 | Heap et al. |
| 2009/0146664 A1 | 6/2009 | Zhang |
| 2009/0266631 A1 | 10/2009 | Kikuchi |
| 2009/0306915 A1 | 12/2009 | Schoch |
| 2010/0000809 A1 | 1/2010 | Nishi et al. |

FOREIGN PATENT DOCUMENTS

| | | |
|---|---|---|
| JP | 2007246050 A | 9/2007 |
| JP | 2009166513 A | 7/2009 |
| WO | 2009069637 A1 | 6/2009 |

OTHER PUBLICATIONS

Joonyoung Park, Youngkug Park, and Jahng-Hyon Park, Real-Time Powertrain Control Strategy for Series-Parallel Hybrid Electric Vehicles, SAE International, www.sae.org, Document No. 2007-01-3472, Aug. 2007, 1 pg.

SYSTEM AND METHOD FOR MANAGING A POWER SOURCE IN A VEHICLE

TECHNICAL FIELD

The present invention relates to a system and method for managing a power source in a vehicle.

BACKGROUND

In a hybrid electric vehicle (HEV) a high voltage battery system may be used to provide power to: a motor to propel the vehicle, a motor to start the engine, a heating, ventilating, and air conditioning system (HVAC), and various other vehicle electrical loads. In the electric drive mode or electric vehicle (EV) mode where the vehicle is propelled solely from the battery power, the battery system is expected to provide as much power as it can to extend the operation of the EV mode in order to achieve the best fuel economy. The transition from the EV mode to the hybrid mode occurs when the vehicle controls, for various reasons, decide to start the engine. This requires additional battery power over that which is required to propel the vehicle in the EV mode. If the battery system does not allow additional power to be used, the driver may feel a loss of driving power, or a "torque hole", as the vehicle controls take power from the traction motor to start the engine. Alternatively, the vehicle controls can temporarily shut down electrical loads, such as the HVAC system; this is also undesirable from a driver comfort standpoint. Therefore, it would be desirable to have a system and method for controlling a power source in a vehicle, such as a battery, that allows a greater power draw from the power system for a short period of time, such as is necessary to start the engine, so as to avoid a power drop from the traction motor or other vehicle electrical loads.

SUMMARY

Embodiments of the present invention include a method for managing a power source in a vehicle that has an engine and an electric machine operable to provide torque to start the engine. The power source has a variable power capability, which may be dependent on any one of a number of different factors. The method includes the step of setting a first discharge power limit for the power source that is at least partly based on the power capability of the power source. A second discharge power limit is set for the power source that is higher than the first discharge power limit. The second discharge power limit is a function of at least the power capability of the power source and the first discharge power limit. The engine has an engine-on power requirement, and in some embodiments of the invention, the second discharge limit is defined as the lesser of the first discharge power limit plus the engine-on power requirement and the power capability.

Embodiments of the invention include a method for managing a power source in a vehicle that has an engine and an electric machine. The method includes the step of setting a first discharge power limit for the power source that is a function of at least a power capability of the power source. The method also includes the step of setting a second discharge power limit that is higher than the first discharge power limit, and which is a function of at least the power capability and the first discharge power limit. In some embodiments of the invention, the first discharge power limit is at least partly based on an amount of power that can be supplied by the power source for a first predetermined amount of time, and the second discharge power limit is at least partly based on an amount of power that can be supplied by the power source for a second predetermined amount of time that is less than the first predetermined amount of time.

Embodiments of the invention also include a system for managing a power source in a vehicle that has an engine and an electric machine operable to provide torque to start the engine. The power source has a variable power capability, that may be dependent upon a number of factors. The system includes a control system having at least one controller. The control system is configured to set a first discharge power limit for the power source that is at least partly based on the power capability of the power source. The control system is also configured to set a second discharge power limit for the power source that is higher than the first discharge power limit. The second discharge power limit is a function of at least the power capability of the power source and the first discharge power limit. In some embodiments of the invention, the control system is further configured to set a first charge power limit for the power source that is at least partly based on the power capability of the power source. The control system is also configured to set a second charge power limit for the power source that is higher than the first charge power limit. The second charge power limit is a function of at least the power capability of the power source and the first charge power limit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
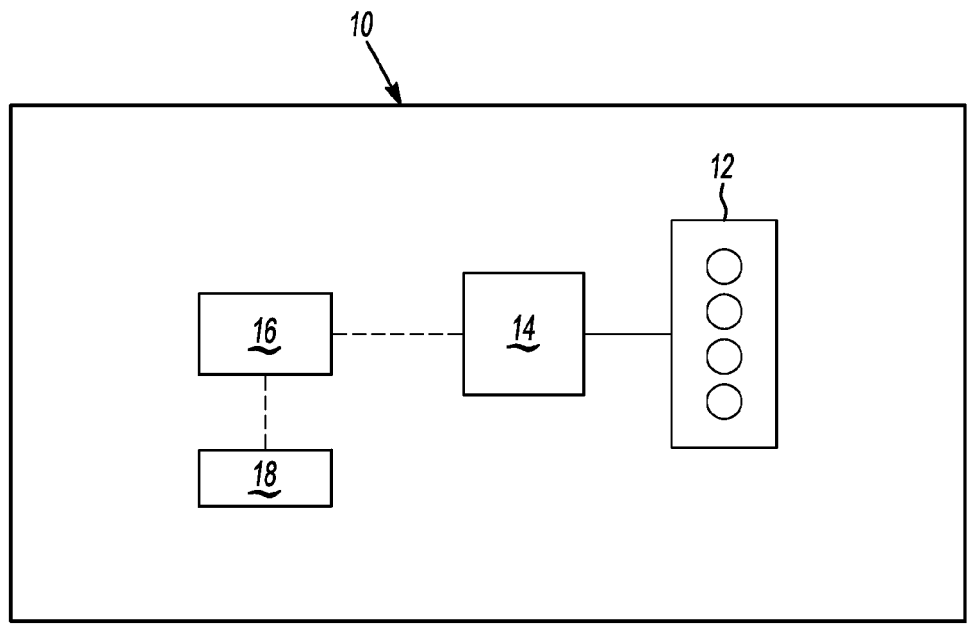
FIG. 1 is a schematic representation of an HEV including a system in accordance with embodiments of the present invention.

FIG. 1 illustrates a vehicle 10 having an engine 12, an electric machine, or motor 14, a power source, or battery 16, and a control system embodied by a battery control module (BCM) 18. It is understood that the BCM may be part of a larger control system, that may, for example, include a controller area network (CAN) that includes a vehicle system controller (VSC), a powertrain control module (PCM), and one or more controllers dedicated to a particular piece of equipment, like the BCM 18.

Figure 2:
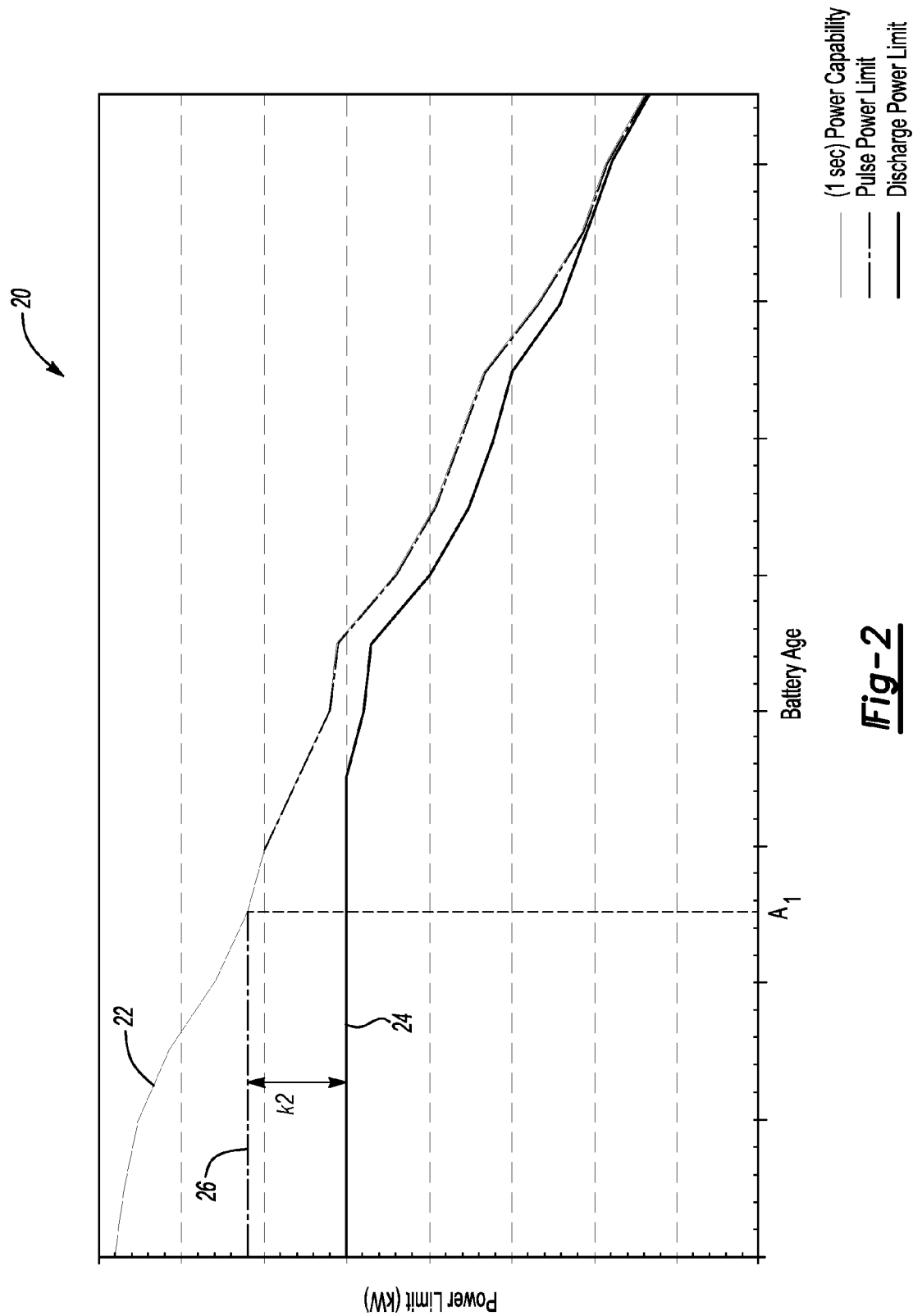
FIG. 2 is a graph showing a battery discharge power limit managed in accordance with embodiments of the present invention.

FIG. 2 shows a graph 20 illustrating the power capability 22 of a battery, such as the battery 16 shown in FIG. 1. As shown in FIG. 2, the power capability curve 22 reduces over time as the battery ages. Thus, the power capability of a ten year old battery may be significantly less than the power capability of the same battery when it is new. In addition to age, the power capability of a power source, such as a battery, may be dependent on other factors such as the battery state of charge (SOC), temperature, and even constraints imposed by other elements of an electrical system—e.g., limits imposed by electrical wiring, fuses, etc. The power capability of a new battery may generally be determined under laboratory conditions, and this information can be initially provided by the battery supplier. Over time, however, as the power capability changes other methods need to be used to determine this value. One such method is described in more detail below in conjunction with FIG. 3.

Regardless of how the battery power capability is determined, embodiments of the present invention use this parameter to help determine certain battery power limits. For example, FIG. 2 shows a first discharge power limit 24 that provides an upper barrier for the amount of power that can be discharged from the battery 16. The discharge power limit 24 may be determined and set by the vehicle manufacturer as a way in ensure that the battery 16 is not over discharged. As shown in FIG. 2, the discharge power limit 24 is generally constant through an early portion of the battery life, and then as the battery ages, the discharge power limit curve 24 generally tracks the power capability 22. This helps to ensure that the battery 16 will be allowed to discharge enough power to operate the motor 14 to start the engine 12. Thus, as the battery nears the end of its useful life, a vehicle operator is allowed to use an amount of power at least up to the power capability of the battery if it is necessary to start the engine.

Also shown in FIG. 2 is a second discharge power limit 26. In the embodiment shown in FIG. 2, the second discharge power limit 26 is a function of at least the power capability and the first discharge power limit. For example, in one embodiment, the second discharge power limit is set based on one or more of the following: an engine-on power requirement, the first discharge power limit, and the power capability of the battery. Using the vehicle 10 shown in FIG. 1 for reference, the engine-on power requirement is an approximate amount of power required by the battery 16 to be supplied to the motor 14 so that it can start the engine 12. In one embodiment of the present invention, the second discharge power limit 26 is defined as the lesser of the first discharge power limit plus the engine-on power requirement, and the power capability. In equation form, this can be written as the following.

$$P_{st\_lim} = \min(P_{cap}, P_{lim}+k2)$$

where:
$P_{s\_lim}$ is the second discharge power limit,
$P_{lim}$, is the first discharge power limit,
$P_{cap}$ is the power capability, and
k2 is the engine-on power requirement.

In FIG. 2, the power (k2) represents the engine-on power requirement. Thus, for a battery age that is less than ($A_1$) the second discharge power limit 26 is defined as the first discharge power limit 24 plus the engine-on power requirement (k2). Once the battery reaches the age ($A_1$), the power value of the first discharge power limit 24 plus the engine-on power requirement (k2) would be greater than the power capability 22; therefore, after a battery age of ($A_1$) the second discharge power limit 26 is equal to the power capability 22. Another approach is to lower the first and second discharge power limits 24, 26 so that the sum of the first discharge power limit 24 plus the engine-on power requirement (k2) is still less than the power capability 22.

Embodiments of the present invention employ the use of a second discharge power limit, such as the discharge power limit 26, that is higher than a first discharge power limit, such as the discharge power limit 24. This is possible, because the first discharge power limit may be defined based on an amount of power that can be supplied by a power source, such as the battery 16, for a first predetermined amount of time; whereas, the second discharge power limit is at least partly defined based on an amount of power that can be supplied by a power source for a second predetermined amount of time that is less than the first predetermined amount of time. For example, a first discharge power limit, such as the discharge power limit 24, may be set so that a battery is allowed to discharge power at this level for five seconds, but the battery is only allowed to discharge power at the level of the second discharge power limit 26 for ½ second. In this way, the second discharge power limit can be used for transient events, such as starting the engine, without damaging the battery—provided of course that the transient events are of relatively short duration.

Embodiments of the present invention may employ the use of a mathematical formula to determine a second discharge power limit, such as the discharge power limit 26. One such equation is shown below.

$$P_{st\_lim} = P_{lim} + k(P_{cap} - P_{lim})$$

where:
$P_{st\_lim}$ is the second discharge power limit,
$P_{lim}$ is the first discharge power limit,
$P_{cap}$ is the power capability, and
k is a coefficient between 0 and 1, inclusive.

In at least some embodiments, the value of (k) is set to 0 when the engine is on and 1 when the engine is off. The value of (k) may also be one when the engine is starting. As readily seen from the equation above, when these numbers are used for the coefficient (k), the second discharge power limit will be equal to the first discharge power limit when the engine is on, and it will be equal to the power capability when the engine is off. In other embodiments, a value between 0 and 1 may be used for the coefficient (k), depending on a number of factors. For example, if the vehicle controls are not capable of tightly controlling the discharge of the battery, the value of (k) may be set to something smaller than 1 to avoid frequently going over the second discharge power limit. If it is determined that the actual power drawn by the battery during a transient discharge, such as an engine start, is greater than the first discharge power limit and less than the power capability, a value of (k) between 0 and 1 may be appropriate. In addition, if there are too many "high power" events in a certain time period, the value of (k) may need to be lowered to avoid reducing battery life. Although occasional "high power" uses may not significantly affect battery life, it may be a goal to keep the root-mean-square power (or current) generally low in order to maintain battery life.

Embodiments of the present invention may employ the use of another mathematical formula to determine a second discharge power limit, such as the discharge power limit 26. One such equation is shown below.

$$P_{st\_lim} = P_{lim} + k*\min((P_{cap}-P_{lim}),k2)$$

where:
$P_{st\_lim}$ is the second discharge power limit,
$P_{lim}$ is the first discharge power limit,
$P_{cap}$ is the power capability,
k is a coefficient between 0 and 1, inclusive, and
k2 is the engine-on power requirement.

This formula uses both the coefficient (k) and the engine-on power requirement (k2). It may be desirable to set the product (k*k2) to be no less than the power required to start the engine. A control of this type can protect the battery even in situations where tight control of the power limit is difficult.

Embodiments of the present invention also include a system for managing a power source, such as the battery 16 shown in FIG. 1. As noted above, the BCM 18 is a controller that may be part of a larger control system used to implement a method of the present invention. For example, the determination of the first and second discharge limits, and even the power capability of the battery 16, may be made by the BCM 18. Alternatively, the BCM 18 may communicate with one or more other vehicle controllers that receive information from other vehicle systems and sensors and communicate information to and from the BCM 18.

Embodiments of the present invention also use first and second charge power limits in a fashion similar to the first and second discharge power limits illustrated and described in FIG. 2. For example, a first charge power limit may be determined for a power source, such as the battery 16, at least partly based on an amount of power that can be received by the battery 16 for a first predetermined amount of time. One such instance would be when the engine 12 is operating and is using the motor 14 as a generator to charge the battery 16 over some extended period. In contrast, a second charge power limit, similar to the second discharge power limit 26 shown in FIG. 2, may be set higher than the first charge power limit and at least partly based on an amount of power that can be received by the battery 16 for a second predetermined amount of time that is less than the first predetermined amount of time. An example of this may be during a transient braking event in which some charge is provided to the battery 16 as a result of a relatively short term braking event. In such a case, the charge provided to the battery 16 may be greater than the first charge power limit, but still allowed by the vehicle control system because it does not exceed the second charge power limit.

Figure 3:
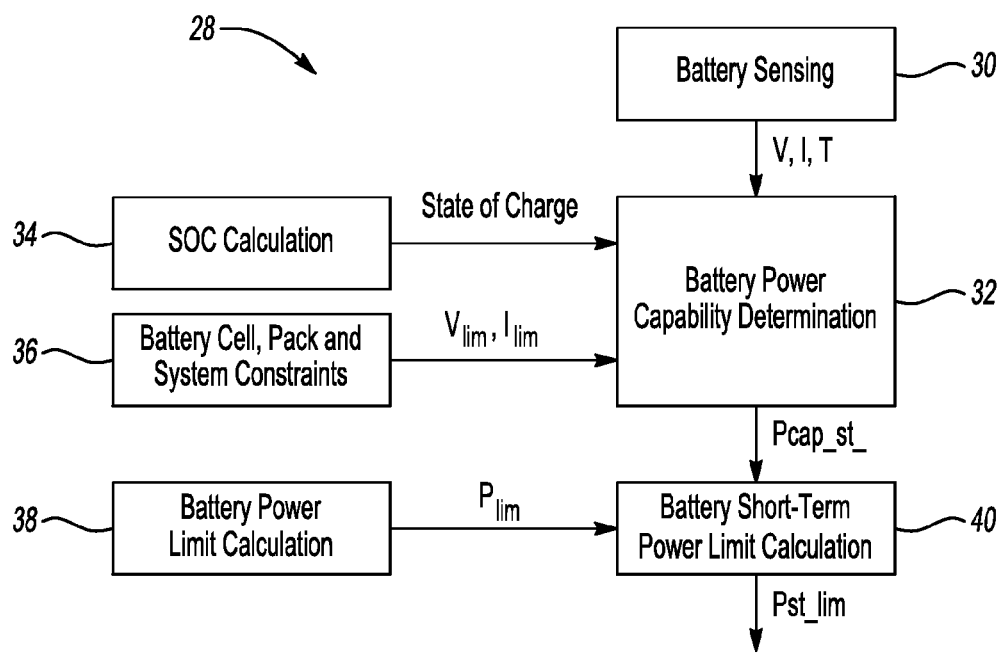
FIG. 3 is a flow chart illustrating a method of managing a power source in accordance with embodiments of the present invention.

FIG. 3 shows a flow chart 28 illustrating steps of a method in accordance with embodiments of the present invention. Initially, certain steps are performed to determine the battery power capability, such as the power capability 22 shown in FIG. 2. For example, at step 30, certain parameters of the battery 16 are sensed, such as voltage, current and temperature. This information is passed to a controller, such as the BCM 18, where a battery power capability determination is made—see step 32. In addition to the battery parameters determined at step 30, an SOC calculation may be made at step 34, and certain constraints determined at step 36. These constraints may be, for example, a limiting value of voltage in a weak cell or cells within the battery structure, or a limiting value of the current. There may also be certain system constraints that limit the voltage or current, such as limitations associated with a wiring system, a fuse, etc. This information can be passed to a control system for the battery power capability determination at step 32. As noted above, there are any number of ways for determining battery power capability that can be used by the present invention to set a short term charge or discharge power limit. The general overview of battery power capability determination described above in steps 30-36 are described in more detail in the patent application Ser. No. 12/987,190, filed contemporaneously with the current application, and which is entitled Method for Determining a Power Capability of a Battery, which is hereby incorporated herein by reference.

Returning to FIG. 3, a first charge or discharge power limit is calculated at step 38, for example, as described above. The first discharge power limit from step 38 and the battery power capability from step 32 are both used to determine a second, or "short-term", charge or discharge power limit at step 40. The actual calculation of the short-term power limit may be in accordance with the procedures described above, for example, in conjunction with FIG. 2. It is understood that because the power capability of a power source may change over time, it may be necessary to periodically adjust the short term charge and discharge limits; such adjustments may occur at a predetermined frequency, or when the power capability changes by a certain amount.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for managing a power source in a vehicle having an engine and an electric machine operable to provide torque to start the engine, the power source having a variable power capability, the method comprising:
   setting a first discharge power limit for the power source that is at least partly based on an amount of power that can be supplied by the power source for a first predetermined amount time;
   setting a second discharge power limit for the power source that is higher than the first discharge power limit, the second discharge power limit being a function of at least the first discharge power limit and an amount of power that can be supplied by the power source for a second predetermined amount of time that is less than the first predetermined amount of time; and
   limiting discharge of the power source to at least one of the first or second discharge power limit.

2. The method of claim 1, wherein the engine has an engine-on power requirement, the second discharge limit being defined as the lesser of the first discharge power limit plus the engine-on power requirement and the power capability.

3. The method of claim 1, wherein the second discharge power limit is defined by the following equation:

$$P_{st\_lim} = P_{lim} + k(P_{cap} - P_{lim})$$

where:
   $P_{st\_lim}$ is the second discharge power limit,
   $P_{lim}$ is the first discharge power limit,
   $P_{cap}$ is the power capability, and
   k is a coefficient between 0 and 1, inclusive.

4. The method of claim 3, wherein the value of (k) is 0 when the engine is on and 1 when the engine is off.

5. The method of claim 1, further comprising:
   setting a first charge power limit for the power source that is at least partly based on the power capability of the power source; and
   setting a second charge power limit for the power source that is higher than the first charge power limit, the second charge power limit being a function of at least the power capability of the power source and the first charge power limit.

6. The method of claim 5, wherein the first charge power limit is at least partly based on an amount of power that can be received by the power source for a first time period, and the second charge power limit is at least partly based on an amount of power that can be received by the power source for a second time period that is less than the first time period.

7. The method of claim 5, wherein the second charge power limit is defined by the following equation:

$$P_{st\_lim} = P_{lim} + k(P_{cap} - P_{lim})$$

where:
- $P_{st\_lim}$ is the second charge power limit,
- $P_{lim}$ is the first charge power limit,
- $P_{cap}$ is the power capability, and
- k is a coefficient between 0 and 1, inclusive.

8. The method of claim 1, wherein the first discharge power limit equals the power capability when the power capability drops below a predetermined value.

9. A method for managing a power source in a vehicle having an engine and an electric machine, the method comprising:
- setting a first discharge power limit for the power source that is a function of at least an amount of power that can be supplied by the power source for a first predetermined amount of time;
- setting a second discharge power limit higher than the first discharge power limit that is a function of at least an amount of power that can supplied by the power source for a second predetermined amount time that is less than the first predetermined amount of time; and
- limiting discharge of the power source to at least one of the first or second discharge power limit.

10. The method of claim 9, wherein the power source is a battery configured to supply power to the electric machine, the engine having an engine-on power requirement defined as the power required from the battery to operate the electric machine to start the engine, the second discharge limit being the lesser of the first discharge limit plus the engine-on power requirement and a power capability of the power source.

11. The method of claim 9, further comprising: setting a first charge power limit for the power source that is a function of at least a power capability of the power source; and setting a second charge power limit higher than the first charge power limit that is a function of at least the power capability and the first charge power limit.

12. The method of claim 11, wherein the first charge power limit is at least partly based on an amount of power that can be received by the power source for a first time period, and second charge power limit is at least partly based on an amount of power that can be received by the power source for a second time period that is less than the first time period.

13. A system for managing a power source in a vehicle having an engine and an electric machine operable to provide torque to start the engine, the power source having a variable power capability, the system comprising:
- a control system including at least one controller, the control system being configured to:
  - set a first discharge power limit for the power source that is at least partly based on an amount of power that can be supplied by the power source for a first predetermined of time;
  - set a second discharge power limit for the power source that is higher than the first discharge power limit, the second discharge power limit being a function of at least the first discharge power limit and an amount of power that can be supplied by the power source for a second predetermined amount of time that is less than the first predetermined amount of time; and
  - limiting discharge of the power source to at least one of the first or second discharge power limit.

14. The system of claim 13, wherein the engine has an engine-on power requirement, and the second discharge limit is defined as the lesser of the first discharge power limit plus the engine-on power requirement and the power capability.

15. The system of claim 13, wherein the second discharge power limit is defined by the following equation:

$$P_{st\_lim} = P_{lim} + k(P_{cap} - P_{lim})$$

where:
- $P_{st\_lim}$ is the second discharge power limit,
- $P_{lim}$ is the first discharge power limit,
- $P_{cap}$ is the power capability, and
- k is a coefficient between 0 and 1, inclusive.

16. The system of claim 15, wherein the value of (k) is 0 when the engine is on and 1 when the engine is off.

17. The system of claim 13, wherein the control system is further configured to set a first charge power limit for the power source that is at least partly based on the power capability of the power source; and
- set a second charge power limit for the power source that is higher than the first charge power limit, the second charge power limit being a function of at least the power capability of the power source and the first charge power limit.

18. The method of claim 9, wherein the first discharge power limit equals a power capability of the power source when the power capability drops below a predetermined value.

19. The method of claim 17, wherein the first charge power limit is at least partly based on an amount of power that can be received by the power source for a first time period, and the second charge power limit is at least partly based on an amount of power that can be received by the power source for second time period that is less than the first time period.

20. The method of claim 13, wherein the first discharge power limit equals the power capability of the power source when the power capability drops below a predetermined value.

* * * * *